INVENTOR.
Charles K. Strobel.

Nov. 4, 1958 — C. K. STROBEL — 2,859,025
CLOTHES DRYING APPARATUS

INVENTOR.
Charles K. Strobel.
BY
Albert J. Henderson
HIS ATTORNEY

Nov. 4, 1958  C. K. STROBEL  2,859,025
CLOTHES DRYING APPARATUS
Filed Sept. 1, 1954  4 Sheets-Sheet 4

INVENTOR.
Charles K. Strobel.
BY
HIS ATTORNEY

United States Patent Office 2,859,025
Patented Nov. 4, 1958

2,859,025

CLOTHES DRYING APPARATUS

Charles K. Strobel, Pittsburgh, Pa., assignor to Robertshaw-Fulton Controls Company, Greensburg, Pa., a corporation of Delaware Application September 1, 1954, Serial No. 453,633

5 Claims. (Cl. 263—33)

This invention relates to clothes drying apparatus and, more particularly, to condition responsive controls for power driven apparatus such as gas or electric clothes dryers.

Appliances of this general character employed heretofore have included a motor driven drum in which the clothes are placed for tumbling, a heater from which heated air may be circulated and a fan for circulating air through the drum and clothing during a drying operation. These appliances are usually controlled by any one of three basic methods. One such method includes the ordinary "on and off" switch for starting and stopping operation of the heater and the fan and an over-temperature thermostat for shutting these elements off in the event of extreme heat in the drum. The second method includes a timing mechanism associated with the "on and off" switch, such mechanism being adjustable for preselected periods of operation whereby, the heater and fan will operate only for such predetermined time limits. The third method, of recent years, utilizes mechanism for controlling the operation of the heater and fan according to the vapor content of the ambient atmosphere in the drum. This method works on the principle that during the initial period of drying most of the heat generated by the heater is converted into latent heat of vaporization and therefore the temperature rise within the drum will be small. As the clothing becomes dry, less heat is converted into latent heat and the temperature within the drum increases to a desired degree whereby shutoff of the heater and blower is effected by means of a thermostatic element responsive to the desired temperature.

The present invention is based on this third method for controlling a drying operation, and includes the usual heater and fan mechanism associated with a rotating drum in such a way that upon manual manipulation of the control switch to its "on" position, the heater, fan and drum will operate simultaneously during the initial stages of the drying operation. Novel means is provided for deenergizing the heater at a predetermined high temperature and allowing the fan and drum to continue their operation until a second predetermined temperature is attained, whereby the fan and drum will cease operation at the end of the drying operation. This means includes a variable time energizing element sensitive to the degree of dryness in the clothing and operates to deenergize the heater when a preset degree of dryness affects the energizing element. A novel adjusting means is also incorporated in the energizing element for varying the high temperature cutoff of the heater and the temperature required for cutting off the fan and drum at the end of a complete drying operation.

It is, therefore, an object of the present invention to render the control of the clothes drying operation fully automatic after the starting operation is accomplished.

Another object of the invention is to utilize a single self-contained control capable of drying clothes to a predetermined degree of dryness.

Another object of the invention is to eliminate the need of close supervision for proper temperature control for clothes made from delicate materials and which require less heat to insure complete dryness.

Other objects and advantages will become apparent from the following description taken in connection with the accompanying drawings forming a part of this application, in which.

Figure 1:
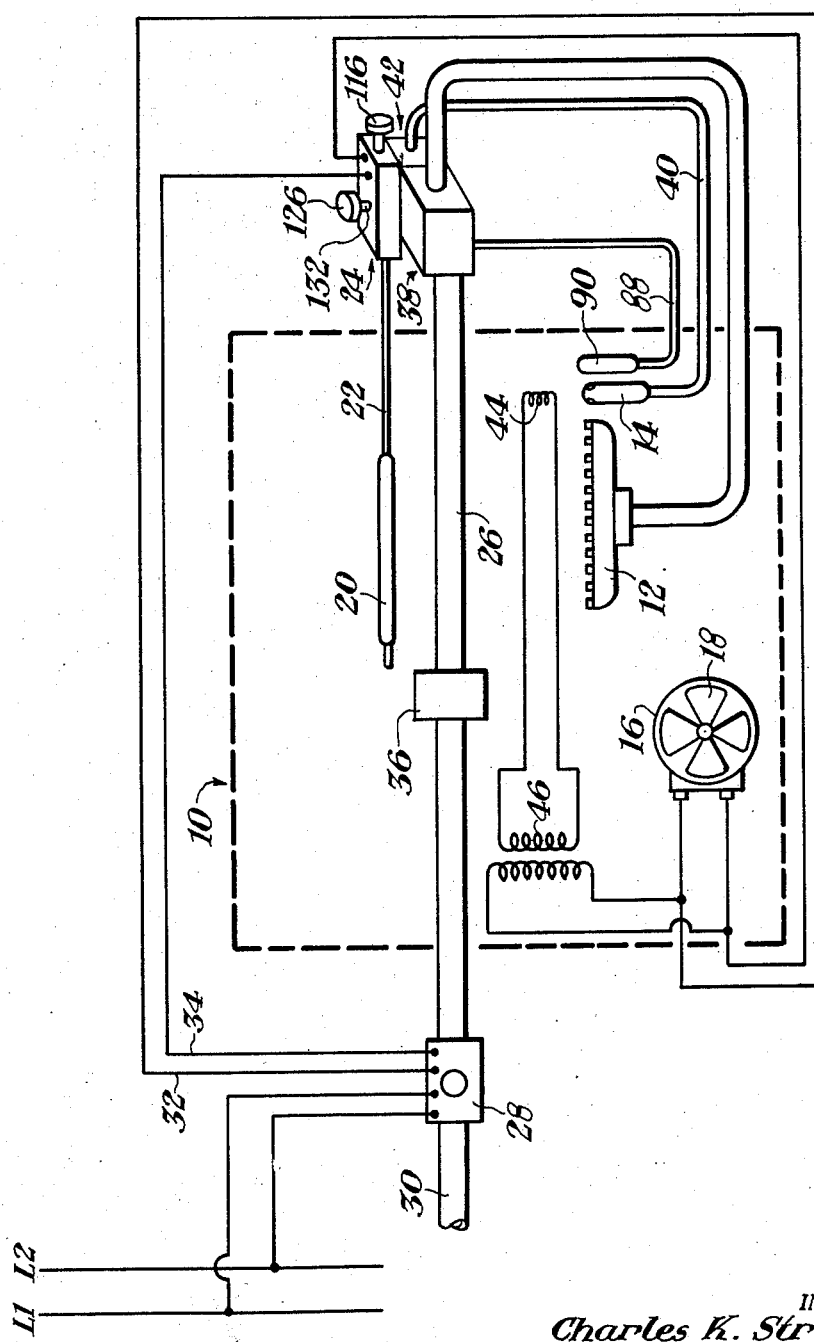
Fig. 1 is a schematic view of a gas clothes drying apparatus forming one embodiment of the invention.

Referring more particularly to Fig. 1, the usual drum 10 is shown as being subjected to the heat of a flame of a main fuel burner 12 having a pilot burner 14 in lighting proximity thereto. The drum 10 is of the power driven type and an electric motor 16 is shown associated therewith for driving purposes. The motor 16 may, in addition, drive the usual fan or blower 18 for circulating the heated air through a load of clothing in the drum 10. A bulb 20 and a portion of a capillary tube 22 of a liquid type thermostat are shown as located adjacent the drum 10 where responses to temperatures therein caused by the heat of the main burner 12 can be obtained. The capillary tubing 22 is connected at the opposite end to a thermostatic switching means located within the heater control thermostat generally designated by the reference numeral 24.

The main burner 12 is indirectly connected to one end of a supply pipe 26, the opposite end of which is connected to a control device designated generally by the reference numeral 28. A main fuel supply pipe 30 is provided at the opposite end of the control device 28, which is the usual gas cock type having a double-pole single-throw switch (not shown) mechanically coupled thereto for supply conductors 32, 34 with electricity from lines L1, L2 of a source of alternating current simultaneously with the opening of the gas cock to the main burner 12. Interposed between the main burner 12 and the control device 28 is an over-temperature safety valve, generally designated by the reference numeral 36, and a thermostatic safety valve indicated at 38.

As previously indicated, the main burner 12 is associated with the pilot burner 14 having the usual conduit 40 connected thereto for supplying the same from a pilot valve housing, indicated at 42, and which will be more fully described hereinafter. In immediate proximity to the pilot burner 14 is an igniter 44 which may be of a catalytic or non-catalytic type and which is supplied with electric current from a transformer 46 having its primary connected to a source of current to be described in detail hereinafter.

Figure 2:
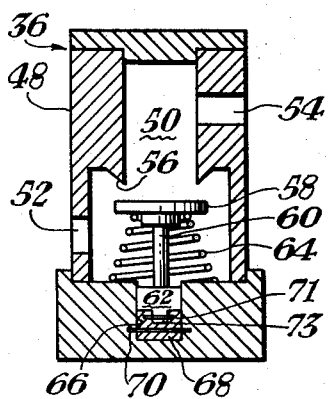
Fig. 2 is an enlarged sectional view of a novel over-temperature safety device as applied to the embodiment of Fig. 1.

The over-temperature safety valve 36 as shown in Fig. 2 consists of a main body 48 having a chamber 50 therein in communication with an inlet 52 for fuel from the main fuel supply pipe 30 and an outlet 54 for connection with the opposite end of the supply pipe 26 leading to the thermostatic safety valve 38. Between the inlet 52 and the outlet 54, a valve seat 56 is made integral with the main body 48 and associated therewith with a valve member 58 having a valve stem 60 and a plunger 62 at one end of the valve stem 60. The valve member 58 is normally held in open position against the bias of spring 64 by means of the plunger 62 extending into a pool 66 of solidified low-melting metal alloy 68, such as one of the bismuth alloys. A pin 70 is provided to insure holding of the alloy 68 without requiring the alloy to adhere to the sides of the pool, and a pin 71 extending through the small portion 73 of the plunger 62 is provided to insure holding of the plunger 62 in the solid alloy 68. It is now apparent that the fuel supply to the termostatic safety valve 38 would be cut off in the event that temperature within the drum 10 was sufficiently high to melt the alloy 68, thus releasing plunger 62 so that the spring 64 would be free to force the valve member 58 to its closed position. The temperature required to melt the alloy may be predetermined and for the purpose of this invention would be approximately 210° F.

Figure 3:
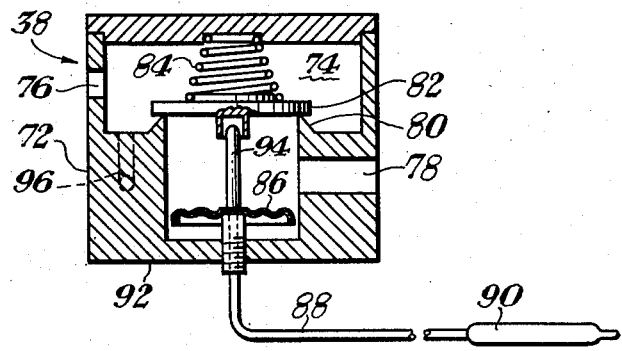
Fig. 3 is an enlarged sectional view of the diaphragm safety valve device employed in the embodiment of Fig. 1.

The thermostatic safety valve 38, shown in Fig. 3, is of the usual type having a main body 72, a chamber 74 therein, an inlet 76 for fuel from the supply pipe 26, an outlet 78, a valve seat 80 located at a point between the inlet 76 and the outlet 78, a valve member 82 and a spring 84 normally biasing the valve member 82 to its closed position on valve seat 80. The valve member 82 is adapted to be moved off the valve seat 80 against the bias of the spring 84 by a thermally responsive device of the mercury vapor type which may comprise the usual expansible element 86, capillary tube 88 and bulb 90. The bulb 90 is disposed adjacent the pilot burner 14 to be heated by a flame emanating therefrom. The expansible element 86 is mounted on the lower portion 92 of the body 72 and secured in fluid sealing relation to the lower side of the main body 72 by any suitable means (not shown). Movement is transmitted from the expansible element 86 to the valve member 82 by means of a thrust rod 94 carried on the upper surface of the expansible element 86. It will be apparent that in the absence of a flame at the pilot burner 14, the expansible element 86 will be in its contracted condition and the spring 84 will hold the valve member 82 against the valve seat 88. It will also be apparent that a flame emanating from the pilot burner 14 will be effective to heat the bulb 90 to cause expansion of the expansible element 86, with consequent upper movement of the thrust rod 94 and movement of the valve member 82 against the bias of the spring 84 and away from the valve seat 80. The main body 72 is also provided with a port 96 which connects the chamber 74 with a chamber within the pilot control housing to be described hereinafter.

Figure 4:
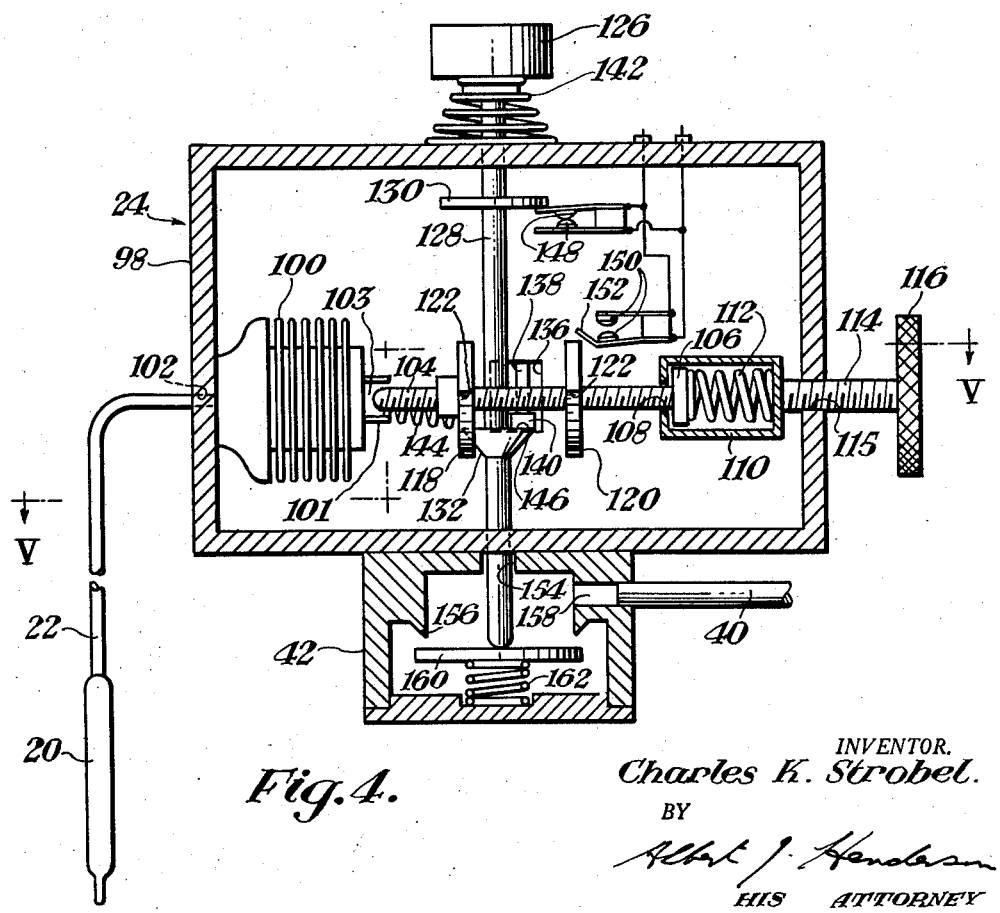
Fig. 4 is an enlarged elevational section of another device employed in the embodiment of Fig. 1.
Figure 5:
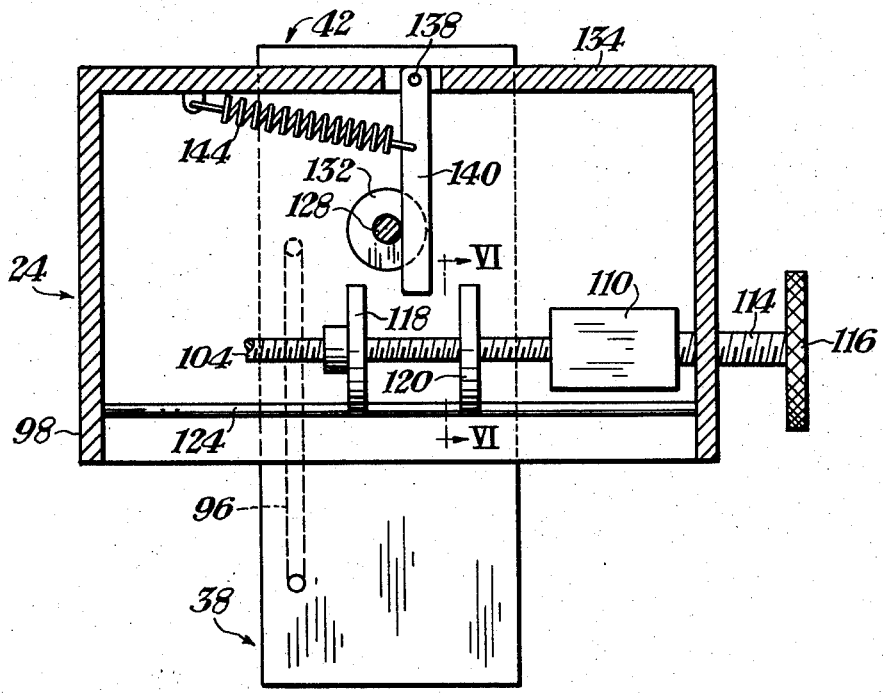
Fig. 5 is an enlarged sectional view in plan taken along the line V—V of Fig. 4.
Figure 6:
Fig. 6 is an enlarged sectional view taken along line VI—VI of Fig. 5.

Referring more particularly to the heater control thermostat 24 shown in Figs. 4, 5 and 6, the arrangement is housed in a main body 98 of generally rectangular form and comprises a thermally responsive device having a bellows 100 secured at one end to the inside wall of the body 98 and in communication with an opening 102 therein for connection to the capillary tubing 22 and bulb 20. The thermally responsive means so formed contains a heat sensitive fluid so that when the bulb 20, which is located to be heated by the atmosphere in the drum 10 becomes heated, the fluid will expand causing corresponding expansion of the bellows 100.

Located adjacent the other end of the bellows 100 and normally spaced therefrom by a space 103 is a threaded rod 104 slidably received in a cup 101 secured to the free end of the bellows 100. The rod 104 extends longitudinally of the body 98 and has its end remote from the bellows 100 terminating in a piston 106 of rectangular configuration. The piston 106 extends through an opening 108 in an override mechanism enclosed in a housing 110 of generally rectangular cross-section which includes an override spring 112 fastened at one end to one wall of the housing 110 and biasing the piston 106 to the left as viewed in Fig. 4. A screw 114 is secured to the housing 110 by any suitable means and projects through a tapped bore 115 in one wall of the body 98. A knurled adjusting knob 116 is fastened at the outer end of the screw 114 and serves as a manual means for rotating the housing 110 thereby rotating the piston 106 and the threaded rod 104. The external rectangular shape of the piston 106 conforms to that of the interior of the housing 110 but is somewhat smaller in dimension so that the piston 106 is adapted to rotate when the housing 110 is rotated but is free to slide therein during axial movement of the rod 104.

The threaded rod 104 is made to move axially against the bias of the spring 112 by expansion of the bellows 100 when the thermal sensitive fluid therein is expanding and to the left by the action of the spring 112 when the bellows is contracting. The rotation of the screw 114 and the housing 110 by manipulation of the knob 116 serves to vary the length of the space 103 for adjusting the distance to which the bellows 100 will have to expand before contacting the left end of the rod 104. This adjustment device, in effect, is a temperature varying means since the amount of heat developed in the vicinity of the bulb 20 for causing a predetermined expansion of bellows 100 will vary according to the distance in which the movable end of the bellows must travel before contacting the end of the rod 104 and the distance in which the rod 104 will then move to the right, as viewed in Fig. 4.

Disposed on the threaded rod 104 and threadedly engaged therewith are two tripping disks 118, 120, each having in their respective peripheries a notch 122 for engaging a rod 124 extending longitudinally of the body 98 and secured at the two end walls thereof by any suitable means. It is to be noted that the lead of the threads on the rod 104 is equal to the lead of the threads on the screw 114 and that rotation of the rod 104 by the knob 116 will move the rod 104 longitudinally with respect to the disks 118, 120, which are locked from rotation by the rod 124. It is now apparent that any adjustment of the rod 104 will not affect the positioning of the disks 118, 120 relative to the main body 98 or the spacing between the same. However axial movement of the threaded rod 104 by the expansion of the bellows 100 will move the rod and the tripping disks 118, 120 together to the right as viewed in Fig. 4. The initial spacing of the disks 118, 120 relative to each other is preferably made during the assembly of the heater control thermostat 24 before the disks 118, 120 are locked from rotation by the rod 124. While unlocked, the disks 118, 120 are rotated relative to each other to effect a desired spacing therebetween. It is to be understood, that each of the disks 118, 120 may include a plurality of notches 122 for finer adjustment therebetween.

A reset button 126 and its related shaft 128 are supported in the main body 98 of the heater control thermostat 24 substantially as shown in Figs. 4 and 5. A washer 130 is secured to the upper portion of the shaft 128 and a beveled locking washer 132 is secured at the lower portion thereof. The back wall 134 of the main body 98 is recessed at 136 for the reception of a pivot stem 138 for a pivotal latching arm 140 which extends from the back wall 134 into the interior of the main body 98. A spring 142 located between the underside of the reset button 126 and the top surface of the main body 98 normally urges the reset button 126 and the shaft 128 upwardly so that the beveled washer 132 is normally positioned above the outer end of the latching arm 140.

In a reset operation, as the button 126 and the shaft 128 are lowered, the latching arm 140 rides on the beveled portion of the washer 132 and is forced outwardly against the bias of the spring 144 until the arm 140 reaches the flat surface 146 of the washer 132 whereby the latching arm 140 will be forced inwardly by the resiliency of the spring 144, such position shown in Fig. 4. With the lever arm 140 in this position, the shaft 128 is locked into position.

The lowering of the shaft 128, in addition, causes the lowering of the washer 130 which abuts and closes the contacts 148 thus closing the circuit for the motor 16 and the fan 18 as well as for energizing the transformer 46 and the igniter 44. The normally open contacts 150 are suitably mounted in the main body 98 and are electrically connected in parallel with the contacts 148. A spring lever 152 is connected to the lower contact 150 and is adapted to ride on the periphery of the tripping disk 120 for closing the contacts 150.

It is apparent, from the foregoing description, that the expansion of the bellows 100 axially displaces the rod 104 and the tripping disks 118, 120 to the right. As the disk 120 travels in its path, it engages the lower surface of the spring lever 152 and slides along the lever 152 forcing the lower contact 150 against the upper contact, which in effect shunts the closed circuit formed by the contacts 148, the motor 16 and the fan 18. Further movement of the rod 104 will cause the disk 118 to engage the end of the pivotal arm 140 and rotate it against the bias of the spring 144 until the arm 140 slides off the surface 146 thereby releasing the shaft 128 from its locked position. The shaft 128 is thus free to move upwardly under the force of the spring 142 causing the simultaneous lifting of the washer 130 and the corresponding opening of the contacts 148. It is to be noted here that the circuit to the motor 16, the fan 18 and the igniter 44 remain closed since the contacts 150 were closed shortly before the contacts 148 were opened.

Mounted below the heater control thermostat 24 is the pilot valve housing 42 having an aperture 154 in the top wall thereof for the reception of the lower end of the shaft 128. The housing 42 includes a valve seat 156 located between an outlet 158 and the port 96 which connects the thermostatic safety valve 38 with the pilot valve housing 42. A valve member 160 is normally biased to its seat 156 by a spring 162. The shaft 128 is adapted to abut the top surface of the valve member 160 and lower it when the reset button 26 is pressed down.

*Operation of Fig. 1 embodiment*

With the various elements in the position shown in Fig. 1 and the system inoperative, the operator deposits a load of damp clothing in the drum 10 in the usual manner. The fuel supply and 115 volt electric supply to the conductors 32, 34 are turned on simultaneously by operation of the control device 28. Thus, fuel will flow through the over-temperature safety device 36, through the supply pipe 26 to the thermostatic safety valve 38 where the fuel will be prevented from flowing to the main burner.

Meanwhile, the reset button 126 is pressed down and serves to lower the valve member 160 allowing fuel to pass from the chamber 74 in the thermostatic safety valve 38 through port 96, through outlet 158 of the pilot valve housing 42 to the pilot burner 14 by the way of the conduit 40. Simultaneously with the lowering of the shaft 128, the contacts 148 are closed by the downward movement of the washer 130. The positioning of the elements 128, 160 and 148 at this stage of operation is shown in Fig. 4. It should be observed that this movement locks the shaft 128 by means of the pivotal arm 140 and the circuit to the motor 16, the fan 18 and the igniter 44 is completed thereby energizing these elements.

Ignition at the pilot burner 14 should now occur and heating of the thermal responsive bulb 90 results in the expansion of the expansible element 86, the lifting of the thrust rod 94 and the consequent opening of the valve member 82 thus allowing fuel to flow through outlet 78 to the main burner 12 where it will be ignited by the pilot burner 14.

The heat of the flame from the main burner 12 in association with the fan 18 commences to raise the temperature of the atmosphere within the rotating drum 10 and the damp clothing contained therein. During the initial stage of the drying period, the temperature within the drum rises slowly as most of the heat in the atmosphere is abstracted as latent heat of vaporization, resulting in a high humidity.

As the dryer continues operation, the temperature within the drum 10 rises and eventually the humidity therein decreases as the water contained in the damp clothing is removed. Since less heat is converted to latent heat, the energy developed by the main burner 12 is converted to sensible heat and a sharp rise in temperature in the drum is experienced. When the temperature of the air in the drum 10 reaches a predetermined value, say at 180° or 190°, the clothing is substantially dry and the thermal bulb 20 expands causing a corresponding expansion of the bellows 100 followed by a displacement of the rod 104 and the tripping disks 118 and 120 to the right. During this operation, the tripping disk 120 slides along the spring lever 152 forcing the contacts 150 to a closed position whereby the holding circuit for the motor 16 and the fan 18 is maintained. After a momentary delay for further expansion of the bellows 100, the tripping disk 118 engages the pivotal arm 140 and pulls it along until the shaft 128 is free to snap upward by the force of the springs 142 and 162 resulting in the opening of the contacts 148 and the closing of the valve member 160 for shutting off the fuel supply at the pilot burner 14.

With the flame of the pilot burner 14 extinguished, the thermal bulb 90 cools rapidly and the expansible element 86 will contract accordingly. The valve member 82 will be seated by the action of the spring 84 and fuel to the main burner 12 will be cut off. In the meantime, the motor 16 and the fan 18 are in continuous operation for circulating heated air within the drum 10 until the thermal bulb 20 has cooled sufficiently to contract the bellows 100 and allow the tripping disk 120 to retract to the left and open the contacts 150. If, during the drying cycle, the temperature within the drum 10 becomes dangerously high, say in case the motor 16 stops operating, or for any other reason, the over-temperature safety valve 36 located within the drum 10 will automatically cut off the flow of fuel to the main burner 12 and thus prevent damage to the clothing and the appliance itself.

Figure 7:
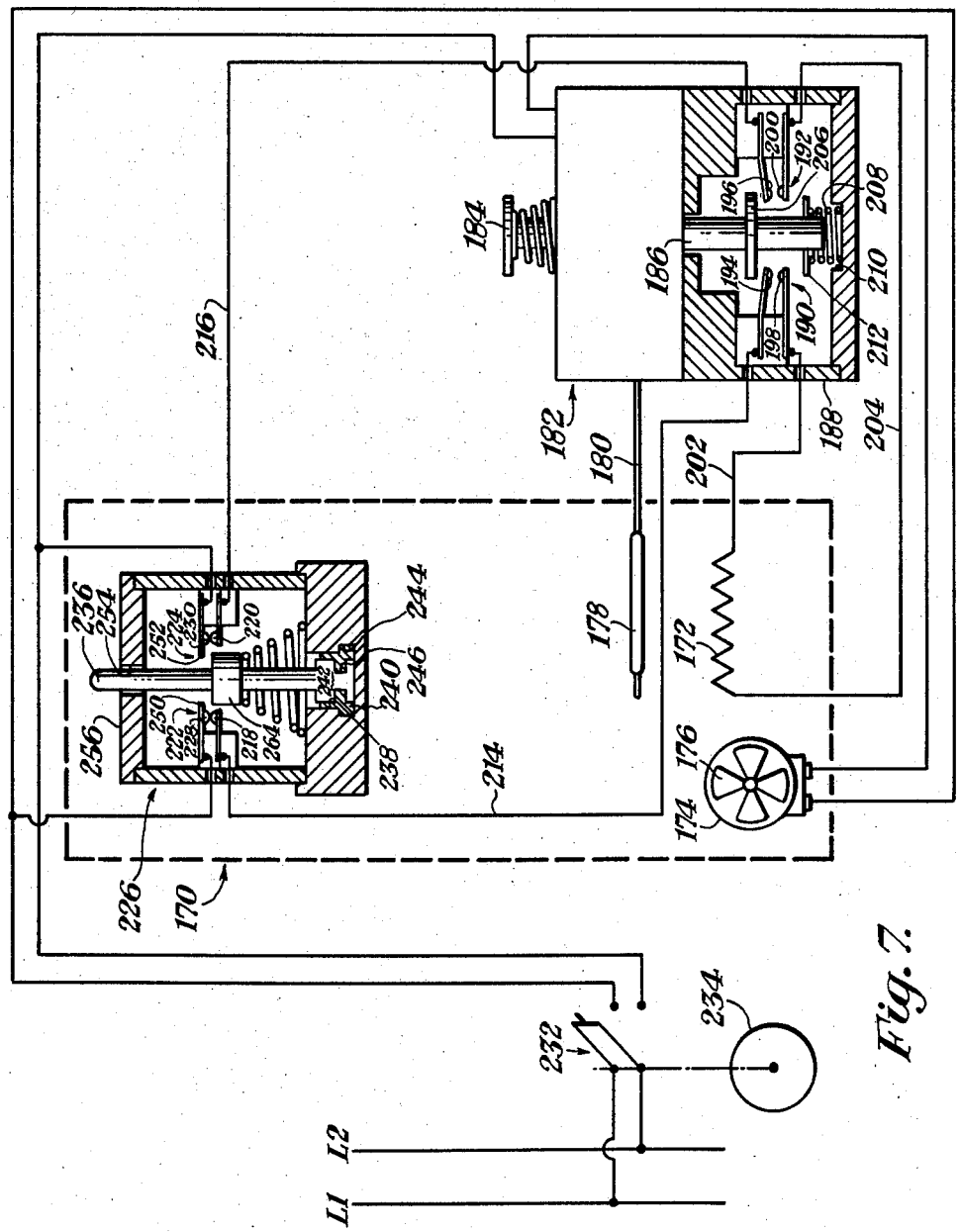
Fig. 7 is a schematic view of a modification of the invention as applied to an electric clothes dryer.

*Embodiment of Fig. 7*

The embodiment disclosed in Fig. 7 of the drawings differs from that disclosed in Fig. 1 by utilizing electrical contacts in place of fuel control means for dryers having electric heater elements instead of fuel burners. Otherwise, the essential elements of the system are identical with those previously disclosed and further description is unnecessary. Referring now more particularly to Fig. 7 of the drawings, the usual drum 170 is shown as being subjected to the heat of an electric heater element 172. The drum 170 is operated by the motor 174 and includes the usual fan or blower 176. A bulb 178, a portion of a capillary tube 180 and the heater control thermostat 182 located within the drum 170 are identical to that disclosed in Fig. 3 and performs the same function of terminating the energization of the heater element 172 at the end of a drying cycle.

The heater control device 182 is manually actuated to initiate energization of the heater 172 and operation of the motor 174 as was the function of the heater control thermostat 24 (Fig. 1). A reset button 184 and its associated shaft 186 is included in the device 182 and serves to close a switch arrangement to be described hereinafter.

Mounted in a switch housing 188, substantially as shown in Fig. 7 are two switches 190 and 192 having upper contacts 194, 196 and lower contacts 198, 200 respectively. Conductors 202 and 204 connect the opposite ends of the heater element 172 to the lower contacts 198, 200 respectively. The shaft 186 has mounted thereon an insulating washer 206 for engaging the upper contacts 194, 196 and force them into engagement with the lower contacts 198, 200 when the reset button 184 is manually pressed down. A coil spring 208 encircling the lower end of the shaft 186 normally biases the shaft 186 upwardly and is held in position by the contours of a recess 210 located in the top surface of the bottom wall of the switch housing 188 and a retaining pin 212 attached to the shaft 186.

The conductors 214, 216 connect the upper contacts 194, 196 to the lower contact arms 218, 220 respectively, located in an over-temperature safety device 226. The respective upper contact arms 228, 230 of the switches 222, 224 are connected to one side of a double-pole, single-throw knife switch 232 mechanically coupled to the main control mechanism 234 by any suitable means. The other side of the knife switch 232 is connected to a source of electric supply indicated as lines L1, L2.

The safety device 226 is similar to that disclosed in Fig. 1 and includes a reciprocating plunger 236 seated in a recess 238 in the base thereof. A fusible material 240 is positioned within the recess 238 and serves to retain the enlarged end 242 of the plunger 236 under normal operating conditions of the drying apparatus. The grooves 244 and 246 in the base of the safety device 226 and the enlarged end 242 respectively serve to anchor the fusible material 240 when solidified much the same as pins 70 in the embodiment of Fig. 2. It is to be noted that either anchor means may be employed without departing from the scope of the invention.

A collar 264 is secured to the medial portion of the plunger 236 and is adapted to engage the extended ends 250, 252 of the upper contacts 228, 230 respectively, thus opening the switches 222, 224 during the upward travel of the collary 264, in the event of overheating in the drum 170. An opening 254 in the cover plate 256 of the over-temperature safety device 226 accommodates the upper end of the plunger 236 and affords a manual resent means for lowering the collar 265 and closing of the switches 222, 224. If, for any reason, overheating does occur, to reset the safety device 226, the operator has only to heat the base of the device 226 by any suitable means, until the fusible material has liquefied. Pressing down on the plunger 236 and allowing the material 240 to cool will firmly lock the plunger 236 in its operative position.

*Operation of the embodiment of Fig. 7*

In the operation of the embodiment of Fig. 7, the operator deposits the damp clothes in the drum 170, manipulates the control mechanism 234 to its "on" position and depresses the reset button 184 whereupon current flows to the over-temperature safety device 226 through the closed switches 190, 192 to the heater element 172.

In the meantime, the closing of the knife switch 232 by the manipulation of the control mechanism 234 and the closing of a switch in the heater control device 182 (not shown closes the circuit to the electric motor 174 and fan 176 since this circuit is shunted across the safety device 226. As the temperature in the drum increases to the desired value of dryness, the thermostatic bulb 178 will expand causing the tripping of the shaft 186 and the opening of the switches 190, 192 with the consequent deenergization of the heater element 172. The motor 174 and the fan 176 continue to operate until a lower temperatur is reached whereupon a circuit to the motor 174 is opened and the drying cycle completed.

It is apparent from the foregoing description of the embodiments of Figs. 1 and 7 that there is provided an improved dryer for clothing wherein the drying time for a given load is substantially reduced. After the wet clothes are put in the appliance and the control set as described, then the heating cycle and cooling down period will take place automatically and the adjustment for different loads is attained so that no estimate of the duration of the drying period is required.

It will be understood that various changes may be made in the details of construction and arrangement of parts in that the control devices may be utilized for useful purposes other than the clothes drying controls. This and other modifications can be made within the scope of the appended claims without departing from the invention defined therein.

I claim:
1. A control device for drying apparatus having main and pilot burners and electrical heat distributing means, comprising switch means operable between positions for controlling a supply of electrical energy to the heat distributing means and being biased to a position to prevent said energy supply, a first valve means operable between positions for controlling a supply of fuel to the pilot burner, means for biasing said valve means to prevent said fuel supply, manually operable means for operating said switch means to an energy supplying position and said first valve means to a fuel supplying position, means for latching said switch means and said first valve means in said supplying position, second valve means operable between positions for controlling a supply of fuel to the main burner, means adapted to be responsive to the heat of the pilot burner for actuating said second valve means to a fuel supplying position, and means adapted to be responsive to an ambient temperature condition caused by operation of the main burner for releasing said latching means and causing operation of said switch means and said first valve means to said energy and fuel supply preventing positions respectively.

2. A control device as claimed in claim 1 wherein said manually operable means includes a movable member operatively engageable with both said switch means and said first valve means for conjoint operation thereof.

3. A control device as claimed in claim 2 wherein said latching means includes an element carried by said movable member and operatively engageable with said ambient temperature responsive means.

4. A control device for drying apparatus having main and pilot burners and electrical heat distributing means, comprising a first circuit for supplying electrical energy to the heat distributing means and including first switch means biased to a position to prevent said energy supply, a second circuit in parallel with said first circuit and including second switch means biased to a position to prevent said energy supply, a first valve means operable between positions for controlling a supply of fuel to the pilot burner, means for biasing said valve means to prevent said fuel supply, manually operable means for operating said first switch means to an energy supplying position, means for latching said first switch means and said first valve means in said supplying position, second valve means operable between positions for controlling a supply of fuel to the main burner, means adapted to be responsive to the heat of the pilot burner for actuating said second valve means to a fuel supplying position, means adapted to be responsive to an ambient temperature condition caused by operation of the main burner for releasing said latching means and causing operation of said first switch means and said first valve means to said energy and fuel supply preventing positions respectively, and means operatively associated with said ambient temperature responsive means for operating said second switch means to an energy supplying position concomitantly with release of said latching means.

5. A control device as claimed in claim 4 wherein said ambient temperature responsive means is operable for causing operation of said second switch operating means to initial position to prevent said energy supply after a predetermined period.

References Cited in the file of this patent

UNITED STATES PATENTS

| 2,564,867 | Weber et al. | Aug. 21, 1951 |
| 2,690,905 | Smith | Oct. 5, 1954 |